May 11, 1937.   J. KRIEGER   2,079,743
MIXING VALVE
Filed July 3, 1935
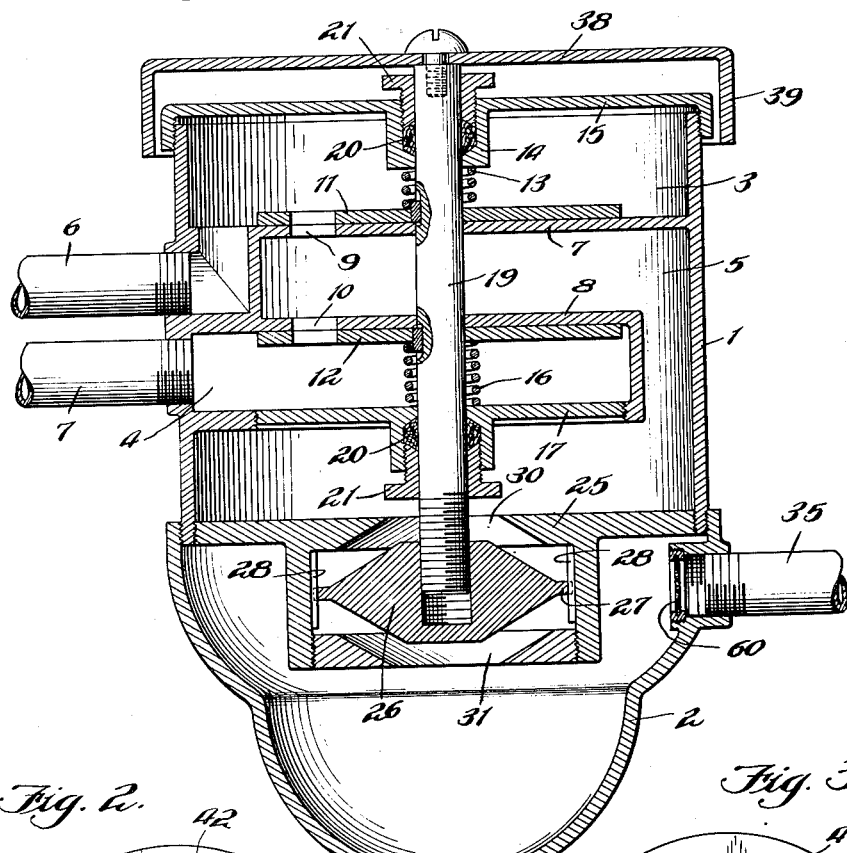
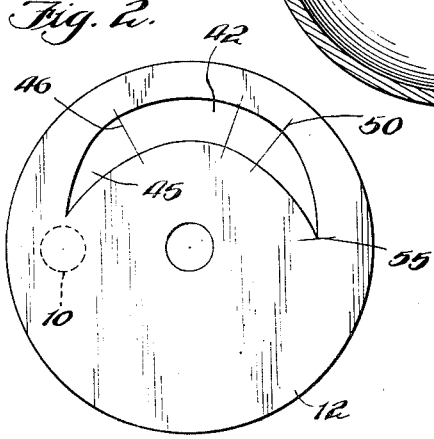
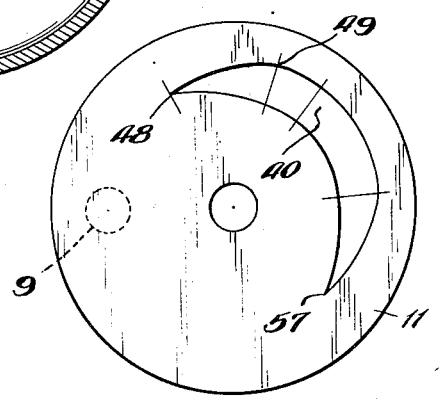
INVENTOR.
Joseph Krieger
BY Morris Spector,
ATTORNEY.

Patented May 11, 1937

2,079,743

UNITED STATES PATENT OFFICE 2,079,743

MIXING VALVE

Joseph Krieger, Chicago, Ill.

Application July 3, 1935, Serial No. 29,633

5 Claims. (Cl. 277—7)

This invention relates to mixing valves, such as are used for mixing two different fluids, such for instance as hot and cold water in a faucet, or for a shower, or for mixing any other liquids in variable proportions.

It is an object of the present invention to provide a simple valve or faucet structure for obtaining the mixing of hot and cold water, or other liquids, in any desired relative proportions, in a simple and expedient manner. It is a further object of the invention to provide such a structure so arranged as to provide for adequate mixing of the two liquids so that the out-flow from this valve or faucet will be of uniform quality throughout.

It is a still further object of the present invention to provide such a structure wherein the valves for controlling the relative proportions of the two liquids are operated by a single actuator.

It is a still further object of the present invention to provide such a valve or faucet with an additional valve structure which will certainly and adequately prevent the leakage of liquid even though the mixing valves may leak.

It is a still further object of the present invention to provide such a mixing valve or faucet with means whereby the stuffing boxes may be adjusted, or renewed, in a simple and expedient manner.

It is a still further object of the present invention to provide a valve or faucet of the above type which shall be simple in construction and economical of manufacture, and which shall contain a comparatively few movable parts.

The attainment of the above and further objects of the present invention will be apparent from the following specification taken in conjunction with the accompanying drawing forming a part thereof.

In the drawing:

Figure 1 is a longitudinal sectional view through the valve or faucet, constructed in accordance with my invention.

Figures 2 and 3 are diagrammatic views illustrating the arrangements of the ports in the valves of the faucet of Figure 1.

Referring now more particularly to Figure 1, the valve comprises an upper section 1 and a lower section 2. The upper section comprises three compartments, namely, an upper compartment 3, a lower compartment 4, and an intermediate compartment 5. The upper and lower compartments are for the hot and cold water, respectively, and the middle compartment is a mixing chamber. Inlet pipes 6 and 7 are provided for the hot and cold water, respectively. The upper compartment is separated from the mixing chamber by means of an integral wall 7, whereas the lower compartment is separated from the mixing chamber by means of an integral wall 8. The walls 7 and 8 are provided with ports 9 and 10, respectively, under the control of disc plates 11 and 12 for establishing communication between the respective sections and the mixing chamber. The disc plate 11 is maintained in firm pressure engagement with the wall 7 by means of a spring 13, which is held in compression by an extended portion 14 of a cover plate 15 that is screw threaded to the top of the section 1. The disc plate 12 is mounted in intimate pressure engagement with the wall 8 by means of a spring 16 that is held in compression by a plate 17 that is screw threaded into the lower part of section 1 of the valve mounting. A valve stem 19 extends through the disc plates and the walls 7—8 and has slotted portions at the adjacent disc plates, which receive keys for locking the disc plates to the stem 19, whereby upon turning of the stem the disc plates 11—12 are turned. The stem extends through the cover 15 and through the lower closure plate 17 and is sealed against leakage by packing 20—20 held in place by packing nuts 21—21. Suitable gaskets may be provided between the section 1 and the upper plate 15 and the lower plate 17 to seal against outward leakage of liquid.

The lower valve mounting 25 is screw threaded to the lower portion of the top section 1 and contains a valve 26 that is threaded on the bottom of the stem 19. The valve 26 is held against rotation by projections 27 that embrace short longitudinal extending projections 28—28 on opposite sides of the valve mounting 25. Thus upon turning of the stem 19 the valve 26 is moved longitudinally upwardly or downwardly, depending upon the direction of the turning of the stem. At its upper extreme travel the valve 26 closes the port 30, and at its lower extreme travel it closes the port 31. The ports 30 and 31 control the flow of liquid from the mixing chamber 5 of the upper section into the lower section 2. Fluid then flows from the lower section 2 to the outlet pipe 35, which may be connected to a faucet, or may itself be a faucet, or may be connected to a bathroom shower. The stem 19 is turned by means of a circular dial type handle 38, which is screwed to the stem and which has flanges 39 that overlie the cover plate 15.

The disc plate 11 has a port 40 therein, of a shape such as is shown more particularly in Figure 3, whereas the disc plate 12 has a port of a similar shape, as indicated at 42, but angularly displaced on the corresponding port 40. When the two plates 11—12 are in the position shown in Figures 2 and 3, they both cover the ports 9 and 10, hence there is no flow of fluid into the mixing chamber. If the stem is rotated counter-clockwise, as seen in Figures 2 and 3, the first turning of the stem brings the portion 45 of the port 42 over the port 10, and thus gradually increases the area of the registering of the openings 42 and 10 to gradually increase the amount of, say, cold water that can flow into the mixing chamber. During this time, and until the point 46 of the port 42 reaches the opening 10, no hot water can flow because no portion of the port 40 is in register with the port 9. When the point 46 reaches the port 10, the edge 48 of the port 40 reaches the port 9, so that thereafter continued turning of the stem neither increases nor decreases the amount of cold water flowing, but it gradually increases the amount of hot water flowing, so that until the point 49 on the valve port 40 is reached, there is a gradual increase in the amount of hot water flowing. Thereafter, and for the next few degrees, there is no change in the relative amounts of hot or cold water. Still further turning of the valve, counter-clockwise, brings the point 50 of the cold water valve opposite the port 10, so that further turning thereof gradually decreases the amount of the cold water flowing, without changing the amount of hot water flowing, so that the temperature of the resulting mixture is gradually increased. When the point 55 is reached all of the cold water is shut off and thereafter further turning of the stem counter-clockwise causes gradual diminution of the amount of hot water flowing, until the point 57 is reached, where both hot and cold water are turned off. During turning of the stem 19 the valve 26 is held against rotation, and therefore moves longitudinally upwardly or downwardly, depending upon the direct rotation of the stem. After the stem has been turned in either direction a certain amount beyond the point of shut off of both the hot and the cold water, the valve 26 engages its upper or its lower valve seat, as the case may be, and closes off the passageway 30 or 31, as the case may be. Closure of either passageway closes off the outlet from the mixing chamber 5 and serves as an additional seal against leakage outwardly of the mixing chamber to the outlet 35, in the event that there is some leakage as a result of wear at the disc plates 11 and 12.

The bottom portion of the section 2 acts somewhat as a dirt trap. It may be cleaned by merely removing the bottom section. When this is done there can be no leakage since both the disc plates 11 and 12 are in their closed position and the valve 26 is also in its closed position, either upper or lower. If desired, a filter may be placed at the point 60.

In compliance with the requirements of the patent statutes, I have here shown and described a preferred embodiment of my invention. It is, however, to be understood that the invention is not limited to the precise construction here shown, the same being merely illustrative of the general principles of the invention. What I consider new and desire to secure by Letters Patent is:

1. A mixing valve comprising one section having hot and cold water compartments and a mixing compartment, valves for controlling the flow of water from the two first mentioned compartments into the mixing compartment, a single actuator for said valves, said valves including means for producing relatively adjustable openings so that the proportions of hot and cold water may each be varied from 0 to 100% of the total by a continuous actuation of the single actuator, said valve having a second section removably secured to the first section and communicating with the mixing compartment thereof, and separate valve means controlling said last mentioned communication, said separate valve means being closed by the first mentioned actuator in opposite extreme positions of the first mentioned actuator.

2. A mixing valve having two compartments separated by a mixing compartment, inlets to the two first mentioned compartments, separate valve means controlling communication between the two first mentioned compartments and the mixing compartment, each of said valve means comprising a stationary plate overlaid by a movable plate, said two plates having openings therein brought into and out of alignment to establish and close off communication with the mixing compartment, spring means maintaining a pressure engagement between the movable plates and the respective fixed plates, the movable and fixed plates having ground fitting engaging surfaces to prevent leakage between them, said mixing compartment having an outlet, valve means controlling said outlet, and a single actuator for simultaneously actuating both movable plates to produce relatively variable flows from the two first mentioned compartments into the mixing compartment and for controlling said outlet-controlling valve means.

3. A mixing valve having a hot water compartment, a cold water compartment, and a mixing compartment, valve means separating the hot and cold water compartments from the mixing compartment, there being an outlet from the mixing compartment, valve means controlling the flow of water through said outlet, and a single actuator for all three valve means, said outlet-controlling valve means being closed by said actuator in opposite extreme positions of said actuator.

4. A mixing valve structure comprising a section having a plurality of inlets and a mixing compartment, valves for controlling the flow from said inlets to said compartment, a single actuator for said valves, said valves including means for producing relatively adjustable openings so that the proportions flowing from the respective inlets may each be varied from 0 to 100% of the total by a continuous actuation of said actuator, said compartment having an outlet, and separate valve means controlled by said actuator and controlling said outlet, said separate valve means being closed by said actuator in opposite extreme positions of said actuator.

5. A mixing valve structure comprising separably connected inlet and discharge casings, valve means controlling the flow between said casings, said discharge casing affording a dirt trap, and means for closing said valve means so that said casings may be separated for cleaning or inspection of said discharge casing without danger of leakage from said inlet casing.

JOSEPH KRIEGER.